UNITED STATES PATENT OFFICE.

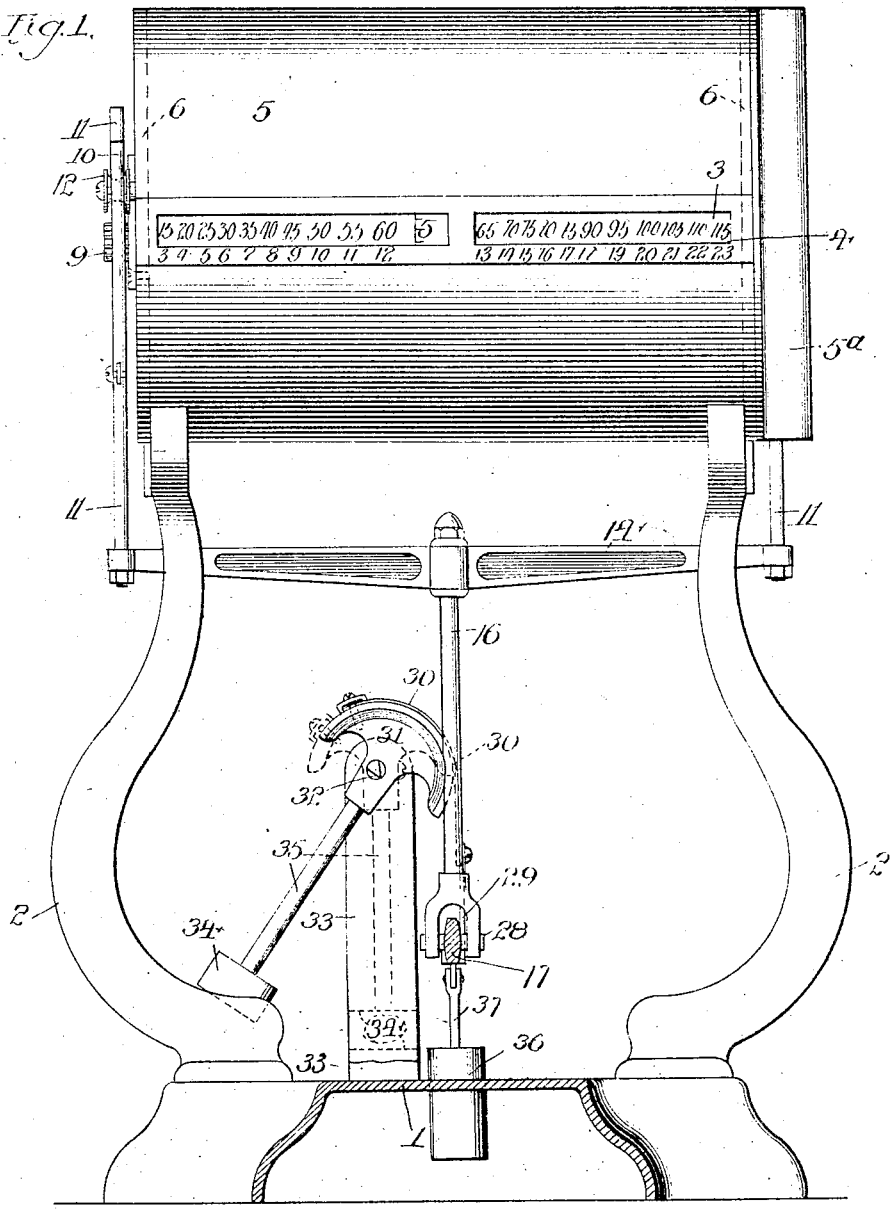

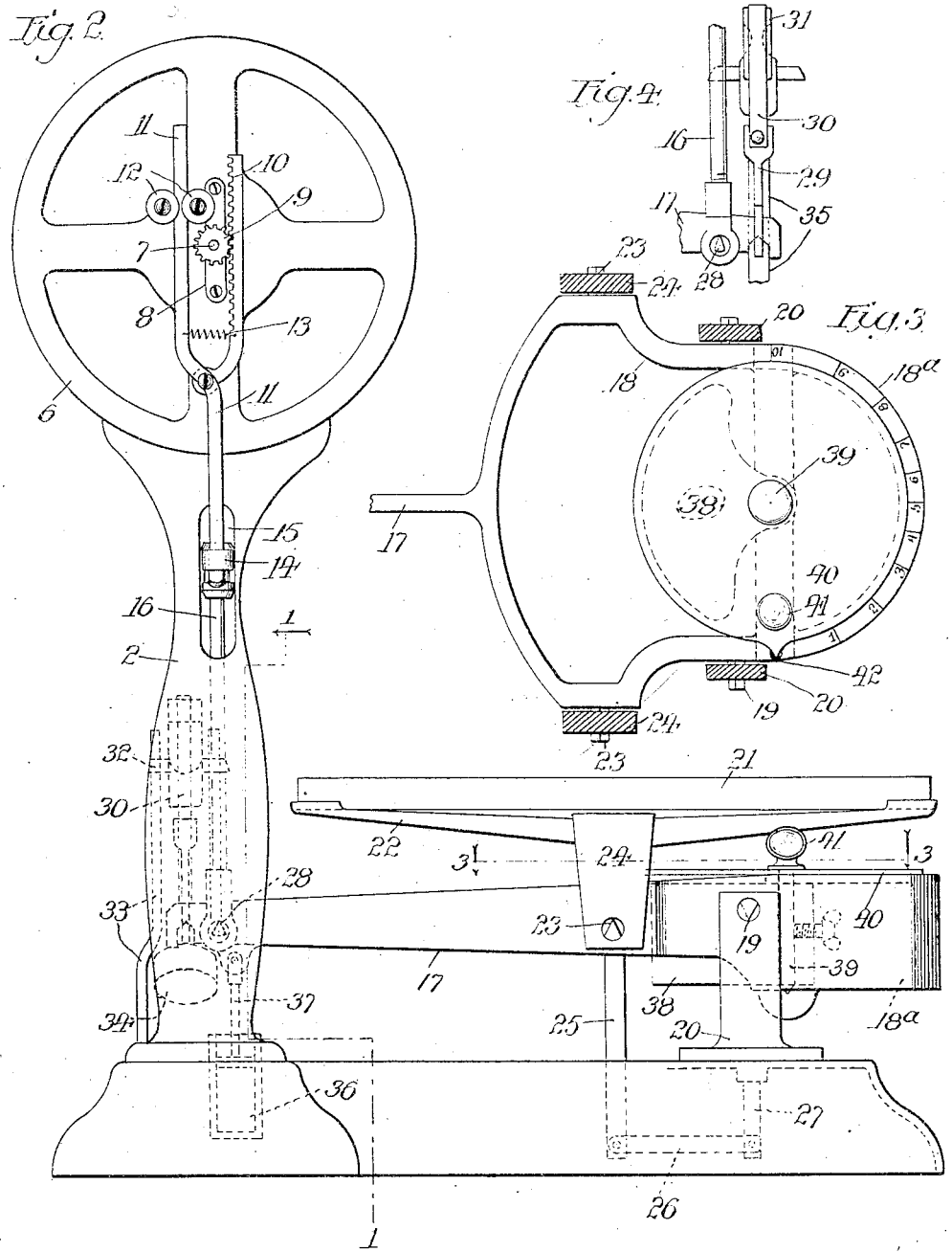

ALLEN DE VILBISS, JR., OF TOLEDO, OHIO, ASSIGNOR TO TOLEDO SCALE COMPANY, OF TOLEDO, OHIO, A CORPORATION OF NEW JERSEY.

SCALE.

1,119,003.   Specification of Letters Patent.   Patented Dec. 1, 1914.

Application filed November 10, 1903, Serial No. 180,595. Renewed October 30, 1913. Serial No. 798,329.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a specification.

My invention pertains to what are commonly known as "computing" scales by which are indicated both the weight and the value of the article or commodity at any given price per pound or other unit of weight.

The object of my invention is to provide a computing scale of the pendulum type with an indicating device of the cylinder or barrel type and thereby produce a computing scale of novel and efficient construction and mode of operation.

My invention also has for its object the provision of a tare beam of novel construction and operation, all as will be hereinafter made apparent.

In the drawings, Figure 1 is a front sectional elevation showing the forward part of the scale as it appears to the salesman, the section being taken through the scale beam or lever only, on line 1—1 of Fig. 2; Fig. 2 a side elevation of my scale with one of the end housings or shields of the barrel or cylinder removed; Fig. 3 a sectional plan on line 3—3 of Fig. 2 showing my novel tare beam, and Fig. 4 a detail view of the connection between the pendulum and scale beam or lever.

The frame of the machine or scale as illustrated in the drawings comprises a base 1 from one end of which rise two standards or supporting posts 2 carrying the automatic price or value computing device. As shown, this device is of the barrel or cylinder type and therefore comprises a barrel 3 having the usual indications which are capable of being exposed through the horizontal sight opening 4 of a housing or casing 5. The lower edge of this sight opening is provided with the numbers or figures beginning as usual with 3 and running in consecutive order to the right to any figure according to the predetermined capacity of the scale. As stated, the barrel has the usual indications, that is, the weight in pounds or other unit of weight and the price or value, the amount or indication which may, in the operation of the machine, be exposed above each figure representing price per pound being the product of the multiplication of such figure by the number of pounds, as is common and well known in scales having this barrel type of indicator.

The immediate mechanism for actuating the barrel comprises essentially a pair of vertically movable racks—one at each end of the barrel—adapted to mesh with and rotate pinions secured to such barrel with the result that the barrel is rotated a distance corresponding to the amount of movement of the racks whose movement is in turn dependent upon the weight of the article or commodity whose value or price is to be computed.

In the machine or scale shown in the drawings, two similar stationary spider frames or end heads 6 (Fig. 2) are arranged within the housing or casing 5 and thereby supported by the standards or posts 2. Suitable trunnions or short shafts 7 at the ends of the barrel, forming the axis thereof, are mounted in the present instance, in suitable bearings in plates 8 fastened to the heads 6 as seen in Fig. 2. Pinions 9 are secured to the ends of the trunnions and adapted to be engaged by vertically movable racks 10. The lower end of each rack is curved inwardly and pivoted to the intermediate curved portion of a vertically movable operating rod 11 which is continued upward parallel to the rack and has its upper end guided and steadied by a pair of idlers 12 mounted to rotate on the end head 6. Each rack and the upper end of its operating rod forms a long U-shaped frame, as clearly indicated in Fig. 2. Each of the operating rods 11 reciprocates in a fixed vertical plane and moves its rack vertically, but in order that it may properly accommodate itself to and have sufficient play with respect to its pinion, the rack is held toward its operating rod with a yielding pressure by means of the spring 13 connected respectively to the rod and rack, as seen in Fig. 2. The end heads and the adjacent operating parts are inclosed by a casing or shield 5ª. The lower ends of the operating rods 11 are secured to the outer ends of a horizontal cross bar or beam 14 passing through vertical openings or slots 15 in the standards or posts 2, Figs. 1 and 2. This cross bar is connected at its middle with a vertical main operating rod 16 whose lower end is operatively connected to the scale or weighing devices now about to be described.

As stated, my scale is of the platform type which, as herein shown, comprises a scale beam or lever 17 whose rear portion is formed into the irregular shaped frame 18, Fig. 3, and in suitable manner pivoted at 19 in vertical posts or supports 20 secured to the base 1 of the machine. The platform here consists of the usual weighing plate 21 resting loosely upon a spider frame 22 which is pivoted at 23 in suitable manner to the scale beam or lever 17 by means of the depending legs 24.

As indicated in Fig. 3, the pivot points or bearings 23 are arranged a considerable distance laterally of the lower portion proper of the scale beam 17 so as to be positioned near the outer margin of opposite sides of the weighing plate, while the bearings 19 are arranged within the line of bearings 23, with the result that tilting movement of such plate is avoided in case the article to be weighed or whose price is to be computed is laid or thrown carelessly on one side of the plate. Inasmuch as the bearings 23 are thus arranged a considerable distance apart a broad or wide bearing is given the plate so that the weight is transmitted to the bearings without tilting of the plate. In order to assure vertical movement of the platform, the same is provided with the depending vertical rod 25 connected at its lower end by means of a horizontal link 26 to a support 27.

The scale beam or lever 17 is pivotally connected in suitable manner near its forward end at 28 to the lower end of the main operating rod 16 as seen in Figs. 1 and 2, while its extreme end is pivotally connected to or hooks over a rod or link 29 whose upper end is secured to a band 30, Fig. 4. This band is secured at its upper or outer end to a segment 31 which is pivoted at 32 to a pair of parallel supporting posts 33 rising from the base of the machine as seen in Fig. 1, or mounted in any other suitable way. A pendulum 34 is connected to the segment 31 by means of a rod 35 with the result that any downward pull of the forward end of the lever is communicated to the band and segment and the pendulum oscillated to the left (Fig. 1) from its normal position of rest, as shown in dotted lines in such figure, the amount of its oscillation depending, of course, upon the weight of the article placed on the platform. The movement is also communicated to the barrel as already explained and the price of the article indicated. For the purpose of cushioning the movements of the scale beam or lever and associated parts, I employ a dashpot 36 connected to the lower edge of the forward end of such lever 17 by the vertical rod 37.

The remaining feature of my invention relates to a novel and efficient construction of tare beam whereby the weight of any receptacle placed upon the scale platform may be counterbalanced. This tare beam comprises a weight 38 adjustably secured to the pivoted pin 39 in the rear portion or frame of the scale beam or lever and capable of being manually swung or oscillated. The extreme rear end of the scale beam is formed as a semicircle 18ª, constituting the tare beam proper and having any desired graduations on its upper edge indicating pounds or any other unit of weight. In the present instance I have shown a series of ten graduations indicating ten pounds, which graduations are differential for a purpose made apparent, such graduations increasing from the center to either end. A plate 40 secured or connected to the weight 38 beneath it is likewise pivoted on the pin 39 and is provided with a knob 41 whereby such plate may be manually oscillated or adjusted to desired position to counterbalance the weight of the receptacle placed on the scale platform. The margin of the plate 40 has a tooth or pointer 42 adapted to be moved over the face of the tare beam graduations. The relative position of this weight 38 and plate 40 is such that when the weight is in its normal position as indicated in the drawings, the pointer on the plate will point to 0 on the tare beam. The weight is of the peculiar shape shown, that is, a segment with its body or main mass normally directed forwardly, with the result that when it is swung or oscillated by the operator, such body will be shifted rearwardly and the weight of the receptacle placed on the scale platform will be thereby counterbalanced. Assuming, for example, that the weight of a filled receptacle the price of whose contents is to be computed, is known to be four pounds, the pointer is moved to the 4 pound graduation mark on the tare beam and the tare beam weight thereby oscillated a certain distance and the barrel will then properly and accurately compute the price of the contents of the receptacle. Assuming next that the receptacle is empty and is to be filled and the price of the contents is to be computed, the pointer and consequently the tare beam weight is moved until the weight of the receptacle becomes balanced, or, as a much speedier method, the weight of the receptacle is first ascertained from the weighing part of the computing mechanism and the pointer then turned to a corresponding indication on the tare beam. The automatic computing mechanism will then be ready to indicate the price of the contents of the receptacle when placed therein.

The drawings represent the relative position of the parts when, for example, an article or commodity weighing five pounds is placed on the scale platform. The scale beam or lever 17 theretofore positioned somewhat obliquely is now substantially horizontal and the pendulum assumes the angular position indicated in full lines in Fig. 1 after being swung from its normal vertical position indicated in dotted lines in said figure. This movement of the scale beam has drawn the cross bar or beam and likewise the operating rods 11 downward with the result that the racks assume, in respect to their pinions, the relative position shown in Fig. 2. The barrel is thereby rotated or oscillated until the weight-figure 5 appears near the center line of the length of the barrel and the numbers 15, 20, 25, 30 *et seq.*, respectively, appear immediately above the fixed or stationary numbers 3, 4, 5, 6 *et seq.* representing price per pound with the result that the weight—5 pounds— and also the price are indicated. For instance, if the price per pound of the article was 3 cents the number 15 immediately above the number 3 indicates the selling price, and so on according to the price per pound.

As apparent from the drawings, the tare beam device is directly in front of the salesman, and within easy and convenient reach, with the graduations on the beam quite visible to him. The computing operations can thus be conveniently and speedily made.

Inasmuch as the tare beam weight has a differential effect through different arcs of its movement, the effect being greatest when the movement of its mass is rearwardly rather than laterally, that is, greatest when the pointer points to the graduation 5 in the present instance, the graduations are made correspondingly differential as hereinbefore explained. In the construction shown the plate 40 serves both as an indicator and means for swinging or adjusting the weight and as a shield or cover for the frame-shaped end of the scale beam. In the present instance the tare beam weight is capable of making a complete rotation but in actual practice it is contemplated to simply oscillate or swing the weight a partial rotation at any one time, so that the weight may be considered as arranged to oscillate.

I claim:

1. A weighing scale comprising load-counterbalancing mechanism, a scale beam or lever coöperating therewith and having one end in the form of an open frame and a tare device consisting of a weight arranged within such frame and eccentrically mounted to swing entirely within the same on a pivot on the central longitudinal axis of the beam to compensate for the tare; substantially as described.

2. A weighing scale comprising load-counterbalancing mechanism, a pivoted scale beam or lever coöperating therewith at one end and having its other end formed as an open frame, and a tare beam device consisting of a segment-shaped weight mounted to oscillate entirely within said frame; substantially as described.

3. A weighing scale comprising load-counterbalancing mechanism, a pivoted scale beam or lever coöperating therewith at one end and having its other end formed as a frame with a semicircular tare beam at its rear end, and a tare beam device consisting of a weight pivoted within the frame of the scale beam, and a pointer movable with said weight and arranged to coöperate with said graduations; substantially as described.

4. A weighing scale comprising load-counterbalancing mechanism, a pivoted scale beam or lever coöperating therewith at one end and having its other end formed as an open frame, and a tare beam device consisting of a weight pivoted within said frame and arranged to be oscillated to change its position relative to the pivotal axis of the scale beam, a plate secured to said weight and closing said frame, and a knob for oscillating the plate; substantially as described.

5. A weighing scale comprising load-counterbalancing mechanism, a pivoted scale beam or lever coöperating therewith at one end and having its other end formed as an open frame, and a tare beam device consisting of a weight pivoted within said frame and arranged to be oscillated entirely within the same to change its position relative to the pivotal axis of the scale beam, a plate secured to said weight and having an index or pointer, and means whereby the plate may be manually oscillated; substantially as described.

6. A weighing scale comprising load-counterbalancing mechanism, a pivoted scale beam or lever coöperating therewith at one end and having its other end formed as a frame 18 with a semicircular portion 18ª provided with a graduated scale, a segment-shaped weight 38 pivoted in the frame with its body normally arranged forwardly of its pivotal point, a circular plate 40 secured to the weight and having a marginal index or pointer adapted to move over the face of said scale, and a knob for oscillating the said plate; substantially as described.

7. A computing scale comprising platform scale mechanism and computing mechanism operated thereby, which latter mechanism consists of a barrel having the usual graduations, a frame in which the barrel is arranged to oscillate or rotate, a pinion on such barrel, a rack arranged to engage and operate the pinion, an operating rod operatively connected to the scale mechanism and to which such rack is operatively connected at a point intermediate the length of such rod and means comprising idlers for guiding the upper free end of the rod and between which the rod passes; substantially as described.

8. A computing scale comprising platform scale mechanism and computing mechanism operated thereby, which latter mechanism consists of a barrel having the usual graduations, a frame in which the barrel is arranged to oscillate or rotate, a pinion on such barrel, a rack arranged to engage and operate the pinion, an operating rod operatively connected to the scale mechanism and to which such rack is operatively connected at a point intermediate the length of such rod, means for guiding the upper free end of the rod, and means for holding the rack toward the rod with a yielding pressure comprising a coiled spring connecting between the rack and rod; substantially as described.

9. A computing scale comprising platform scale mechanism and computing mechanism operated thereby, which latter mechanism consists of a barrel having the usual graduations, a frame in which the barrel is arranged to oscillate or rotate, a pinion on such barrel, a rack arranged to engage and operate the pinion, an operating rod operatively connected to the scale mechanism and to which such rack is operatively connected, a pair of idlers between which the upper end of the rod is guided, and means for holding the rack toward the rod with a yielding pressure; substantially as described.

10. A computing scale comprising platform scale mechanism and computing mechanism operated thereby, which latter mechanism consists of a barrel having the usual graduations, a frame in which the barrel is arranged to oscillate or rotate, a pinion on such barrel, a rack arranged to engage and operate the pinion, an operating rod operatively connected to the scale mechanism and to which such rack is operatively connected, said rod being curved intermediate of its length where the rack is pivoted thereto and having its upper free end extending parallel to the rack, idlers between which such free end of the rod passes and is thereby guided, and means for holding the rack and rod toward each other with a yielding pressure; substantially as described.

11. In a computing scale having an automatic computing device of the barrel type, the means for actuating said barrel comprising pinions connected to the ends of the barrel, a pair of operating rods and racks pivoted thereto intermediate of their length, idlers for guiding the upper free ends of the rods respectively, and springs coöperating with said rods and their respective racks for holding them toward each other with a yielding pressure and means for connecting said operating rods; substantially as described.

12. In a computing scale having an automatic computing device of the barrel type, the means for actuating said barrel comprising, in combination with end heads in which the barrel is mounted to rotate or oscillate, pinions connected to the barrel at both ends thereof, a pair of vertical operating rods bent or curved intermediate of their length, idlers mounted on said end heads and arranged to guide the upper ends of the rods, and racks adapted to engage said pinions and pivoted to said rods respectively at their said curved portion; substantially as described.

13. In a computing scale having an automatic computing device of the barrel type, the means for actuating said barrel comprising, in combination with end heads in which the barrel is mounted to rotate or oscillate, pinions secured to the axis of the barrel at both ends thereof, a pair of vertical operating rods bent or curved intermediate of their length, idlers mounted on said end heads and arranged to guide the upper ends of the rods, racks arranged to engage said pinions and pivoted to said rods respectively at their said curved portion, and springs interposed between the rods and racks adjacent their pivotal point for holding them toward each other with a yielding pressure and means for connecting said operating rods; substantially as described.

14. In a computing scale having platform scale mechanism and an automatic computing device of the barrel type, the means for actuating said barrel comprising, in combination with a pinion connected to the barrel at its axis, an operating rod operatively connected at one end to said scale mechanism, means for guiding the other end of said rod, a rack connected to the rod and arranged to engage said pinion, and a tare beam carried by and coöperating with the scale mechanism and consisting of a weight arranged to be swung substantially as described.

15. The combination of a scale beam pivoted intermediate its ends and formed at one end as an open frame, load counter-balancing means at the opposite end of the beam, an indicator above that end of the beam and operatively connected therewith, a tare weight movable independently within said frame of the beam, said frame having a tare scale extending crosswise thereof, an indicator connected to and moving with the tare weight and coöperating with the tare scale.

16. A weighing scale comprising a scale beam or lever pivoted intermediate its ends, load-counterbalancing means connected to one end thereof, the other end comprising an open frame a portion of which is semi-circular, and a tare device consisting of a weight pivoted to the lever substantially on the median line of the latter at the center of the semi-circular portion of the frame whereby the center of gravity of the weight may be shifted with reference to the axis of oscillation of the beam.

ALLEN DE VILBISS, Jr.

Witnesses:
S. E. HIBBEN,
LOUIS B. ERWIN.